(12) United States Patent
Ni et al.

(10) Patent No.: US 11,980,195 B2
(45) Date of Patent: May 14, 2024

(54) NOODLE CUTTER ASSEMBLY AND DOUGH EXTRUDER

(71) Applicant: DONGGUAN ZHEN ZHONG KANG PRECISION TRANSMISSION TECHNOLOGY CO., LTD, Dongguan (CN)

(72) Inventors: Tangrong Ni, Dongguan (CN); Xiaoling Sheng, Dongguan (CN)

(73) Assignee: DONGGUAN ZHEN ZHONG KANG PRECISION TRANSMISSION TECHNOLOGY CO., LTD, Dongguan (CN)

( * ) Notice: Subject to any disclaimer, the term of this patent is extended or adjusted under 35 U.S.C. 154(b) by 346 days.

(21) Appl. No.: 17/562,314

(22) Filed: Dec. 27, 2021

(65) Prior Publication Data

US 2023/0083905 A1   Mar. 16, 2023

(30) Foreign Application Priority Data

Sep. 14, 2021 (CN) ......................... 202111077574.5
Sep. 14, 2021 (CN) ......................... 202122227853.7

(51) Int. Cl.
| A21C 11/24 | (2006.01) |
| A21C 11/10 | (2006.01) |
| A21C 11/22 | (2006.01) |

(52) U.S. Cl.
CPC .............. *A21C 11/24* (2013.01); *A21C 11/10* (2013.01); *A21C 11/22* (2013.01)

(58) Field of Classification Search
CPC ......... A21C 11/24; A21C 11/10; A21C 11/22; A21C 1/1495; A21C 11/20; A21C 11/16; A21C 1/14; A21C 13/00; A21C 1/02
USPC ............................................................ 30/306
See application file for complete search history.

(56) References Cited

U.S. PATENT DOCUMENTS 4,025,260 A * 5/1977 Neel ..................... B30B 11/221
99/450.6

FOREIGN PATENT DOCUMENTS

| CA | 3090937 C  | * | 7/2021 | ............. A21C 11/16 |
| CN | 112640930 A | * | 4/2021 | ............... A21C 1/02 |
| CN | 111452102 B | * | 5/2021 | ............... B26D 1/035 |
| CN | 116533301 A | * | 8/2023 | ............... B26D 1/28 |

* cited by examiner

*Primary Examiner* — Ghassem Alie
(74) *Attorney, Agent, or Firm* — Westbridge IP LLC

(57) ABSTRACT

Disclosed are a noodle cutter assembly and a dough extruder. The noodle cutter assembly includes: a rotary bracket including a first support arm and a second support arm opposite to each other, a bracket axis being arranged on a same side of the first support arm and the second support arm, the first support arm and the second support arm being both extended along a circumferential direction of the support axis, the rotary bracket being configured for sleeving an outer side of a noodle out-coming die and rotating relative to the noodle out-coming die; and a noodle cutter connected between the first arm and the second arm, and configured for sliding and abutting on outer edges of noodle out-coming holes.

14 Claims, 9 Drawing Sheets

NOODLE CUTTER ASSEMBLY AND DOUGH EXTRUDER

CROSS-REFERENCE TO RELATED APPLICATIONS

The present application claims the benefits of Chinese Patent Applications No. 202111077574.5 filed on Sep. 14, 2021 and No. 202122227853.7 filed on Sep. 14, 2021, and the entire disclosures of which are hereby incorporated by reference, in their entireties, for all that they teach and for all purposes.

TECHNICAL FIELD

The present application relates to the technical field of noodle cutters, in particular to a noodle cutter assembly and a dough extruder.

BACKGROUND

In the field of food industry, the dough extruder is a common food machinery that replaces manual noodle making to make noodle. The dough extruder usually includes a dough extruder body and a noodle out-coming die, particularly the dough extruder body is provided with a dough channel and a pushing screw arranged in the dough channel, the noodle out-coming die is provided with an extrusion cavity, a dough inlet and a plurality of noodle out-coming holes which are all communicated with the extrusion cavity, and the dough inlet is communicated with an outlet of the dough channel. Under the action of manpower or electromechanical force, the kneaded dough is pushed by the extrusion of the pushing screw, to enter the extrusion cavity through the dough channel and the dough inlet, and then be extruded to the outside of the noodle out-coming die through the noodle out-coming holes, that is, noodles matching a shape of the noodle out-coming holes are formed. However, in fact, the continuously extruded noodles are inconvenient to eat because they are too long, so users usually want to cut the extruded noodles into multiple segments.

The existing dough extruder requires the users to hold scissors and place the scissors outside the noodle out-coming holes to cut the noodles by any needed length. However, this operation often fails to smooth the breaks of noodles, and even leads to noodles adhesion and not be completely separated, and results in poor user experience.

SUMMARY

The main purpose of the present application is to provide a noodle cutter assembly, aiming at improving convenience of cutting operation of a dough extruder.

In order to achieve the above purpose, the noodle cutter assembly provided by the present application includes:

a rotary bracket including a first arm and a second arm opposite to each other, where the rotary bracket includes a bracket axis arranged on a same side of the first arm and the second arm, the first arm and the second arm are all extended along a circumferential direction of the bracket axis, the rotary bracket is configured for sleeving an outer side of the noodle out-coming die and rotating relative to the noodle out-coming die; and, a noodle cutter connected between the first arm and the second arm, and configured for slidably abutting outer edges of noodle out-coming holes.

Optionally, the rotary bracket further includes a first reinforcing arm connecting the first arm and the second arm.

Optionally, the rotary bracket further includes a second reinforcing arm opposite to the first reinforcing arm, the second reinforcing arm is connected with the first arm and the second arm, and the noodle cutter is positioned between the first reinforcing arm and the second reinforcing arm.

Optionally, a central angle of the first arm and/or the second arm corresponding to the bracket axis is greater than 180 degrees, and the first arm, the second arm, the first reinforcing arm and the second reinforcing arm together define a mounting space for receiving the noodle out-coming die.

Optionally, both the first arm and the second arm are elastically deformable, and a mounting opening communicated with the mounting space is arranged between the first reinforcing arm and the second reinforcing arm and opposite to the noodle cutter, and the mounting opening is configured for the noodle out-coming die to move through and be clamped in the mounting space.

Optionally, the first arm includes a first arm segment and a second arm segment, the second arm includes a third arm segment and a fourth arm segment, the first arm segment and the third arm segment are disposed oppositely, and the second arm segment and the fourth arm segment are disposed oppositely;

the first arm segment, the first reinforcing arm and the third arm segment are integrally formed to form a first bracket, the noodle cutter assembly is connected between the first arm segment and the third arm segment, the second arm segment, the second reinforcing arm and the fourth arm segment are integrally formed to form a second bracket, and the second bracket is elastically deformable.

Optionally, the first bracket is made of metal.

Optionally, the second bracket is made of plastic material.

Optionally, two inserting holes are arranged at two ends of the second bracket corresponding to the first bracket, and the two ends of the first bracket are respectively inserted in the two inserting holes.

Optionally, the rotary bracket further includes a hand-driving member connected to the second reinforcing arm, and obliquely extended in a direction away from the mounting opening in a direction away from the noodle cutter.

Optionally, the noodle cutter assembly further includes a fastening member arranged at the mounting opening, one end of the fastening member is rotatably connected with the first reinforcing arm, and the other end is detachably connected with the second reinforcing arm.

Optionally, the first arm and the second arm are in slidably contact with a first sliding groove and a second sliding groove defined and extended along the outer circumferential surface of the noodle out-coming die correspondingly.

Optionally, the first arm is provided with a first limiting protrusion and the second arm is provided with a second limiting protrusion, the first limiting protrusion is configured for slidably abutting a first limiting groove defined and extended along the noodle out-coming die, and the second limiting protrusion is configured for slidably abutting a second limiting groove defined and extended along the noodle out-coming die.

Optionally, the outer circumferential surface of the noodle out-coming die is further provided with a plurality of noodle out-coming bosses, and a plurality of noodle out-coming holes are distributed at intervals on the noodle out-coming bosses, and the noodle cutter is slidably abutting surfaces of the noodle out-coming bosses.

Optionally, the present application further provides a dough extruder including the noodle cutter assembly above.

In the technical proposal of the present application, the rotary bracket sleeved on the noodle out-coming die is configured to rotate around the noodle out-coming die, thereby driving the noodle cutter connected between the first arm and the second arm to slide reciprocally against the outer edge of the noodle out-coming hole, and forming a shearing force between the noodle cutter and the outer edge of the noodle out-coming hole, and the noodles are evenly sheared and broken under the action of the shearing force, with flat breaks and no adhesion. Secondly, the user only needs to control the rotation of the rotary bracket on the noodle out-coming die to cut the noodles, thereby realizing a blind operation without paying attention to the operation of the noodle cutter. Compared with the scissors tool, the technical proposal provided by the present application improves the convenience of the cutting operation of the dough extruder. Furthermore, the user may freely control a rotation of the rotary bracket on the noodle out-coming die, that is to say, a reciprocating sliding of the noodle cutter outside the noodle out-coming hole is freely controlled, so that the user cuts noodles according to any needed length, for example, the noodles with longer length suitable for adults to eat are cut out firstly, and the noodles with shorter length suitable for children to eat are cut out secondly, thereby improving the flexibility of cutting operation of the dough extruder. It should be noted that when the cutting cutter slides against the outer peripheral surface of the noodle out-coming die, the bracket axis is parallel or nearly parallel to the axis of the noodle out-coming die.

BRIEF DESCRIPTION OF THE DRAWINGS

In order to more clearly explain the embodiments of the present application or the technical proposal in the prior art, the drawings required in the description of embodiments or prior art will be briefly described below. It will be apparent that the drawings described below are only some embodiments of the present application, and other drawings may be obtained from the structure shown in these drawings without any creative effort by those of ordinary skill in the art.

The realization of the purpose, functional features and advantages of the present application will be further explained with reference to the accompanying drawings in combination with the embodiments.

DETAILED DESCRIPTION OF THE EMBODIMENTS

A clear and complete description of the technical aspects of the embodiments of the present application will be given below in conjunction with the accompanying drawings in the embodiments of the present application, and it will be apparent that the described embodiments are only part and not all of the embodiments of the present application. Based on the embodiments in the present application, all other embodiments obtained without creative effort by those of ordinary skill in the art fall within the scope of the present application.

It should be noted that if the embodiment of the present application relates to directivity indications (such as up, down, left, right, front, back, etc.), the directivity indications are only used to explain a relatively positional relationship, motion situation, etc. among the components in a specific posture (as shown in the attached drawings), and if the specific posture is changed, the directivity indications are changed accordingly.

In addition, if there are descriptions relating to "first", "second", etc. in embodiments of the present application, the descriptions of "first", "second", etc. are for descriptive purposes only and should not be understood as indicating or implying their relative importance or implying a number of technical features indicated. Thus, features defined as "first", "second" may explicitly or implicitly include at least one of the features. In addition, the meaning of "and/or" in the whole text includes three parallel schemes, taking "A and/or B" as an example, it includes scheme A, or scheme B, or both scheme A and B. In addition, the technical solutions among the various embodiments may be combined with each other, but must be on a basis that a person of ordinary skill in the art can realize the combinations. When a combination of technical solutions conflicts or cannot be realized, it should be considered that the combination of technical solutions does not exist and is not within the scope claimed by the present application.

Figure 2:
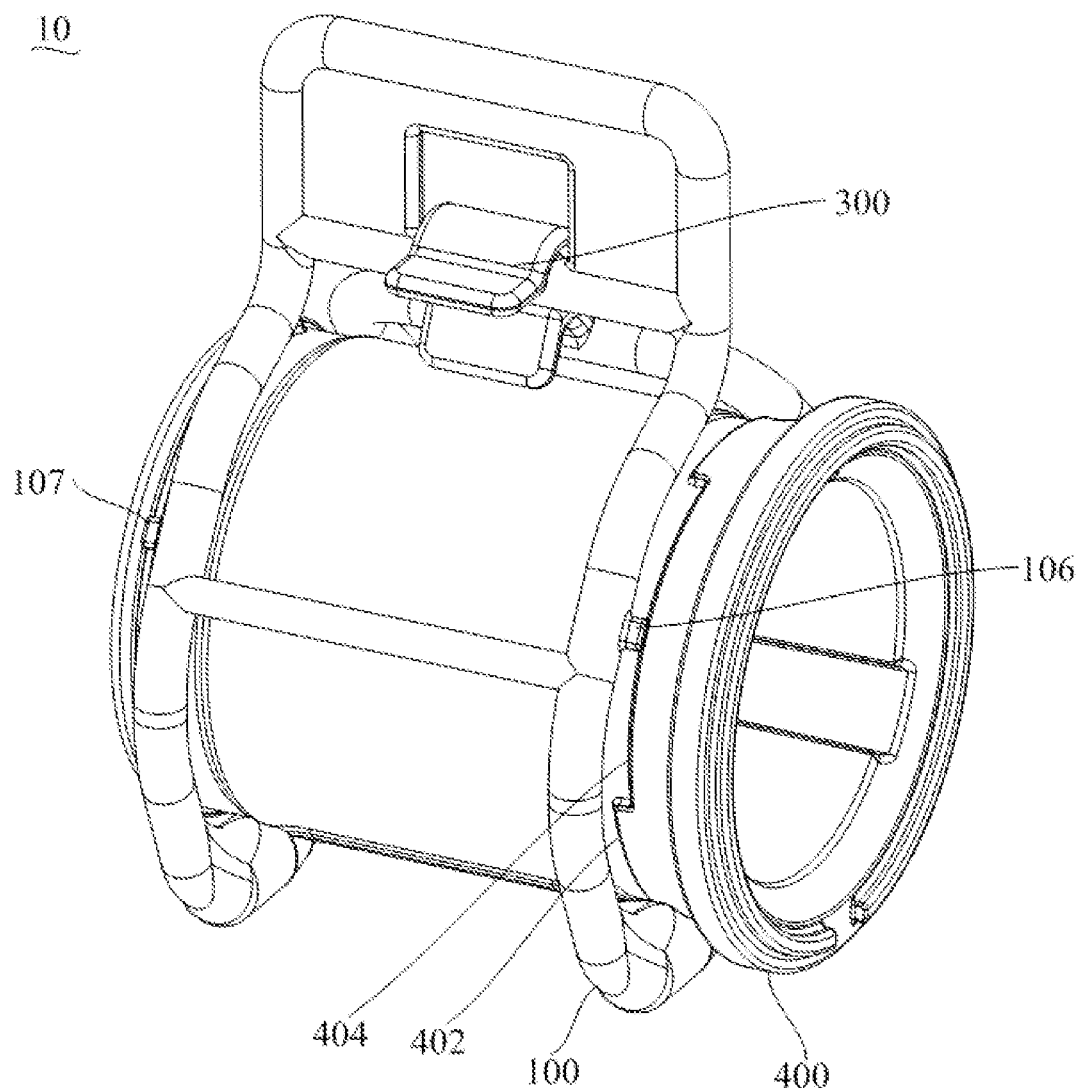
FIG. 2 is another schematic structural view of the noodle cutter assembly in FIG. 1.
Figure 3:
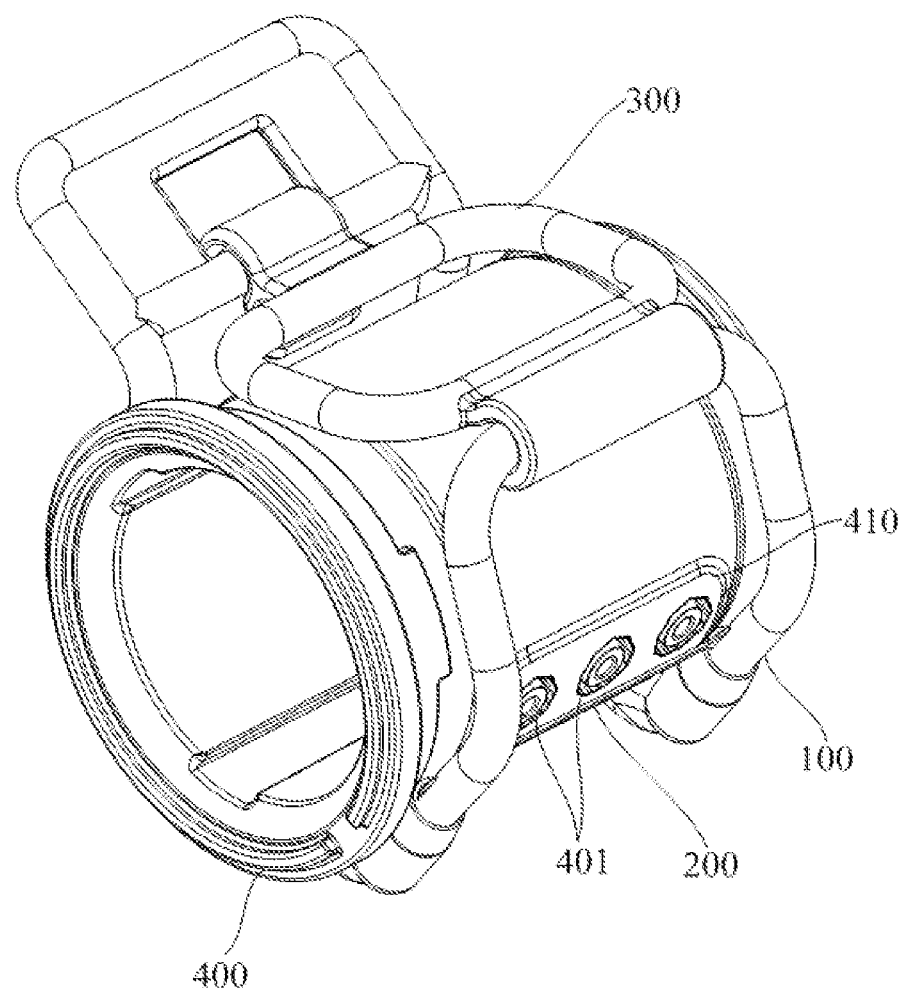
FIG. 3 is still another schematic structural view of the noodle cutter assembly in FIG. 1.
Figure 4:
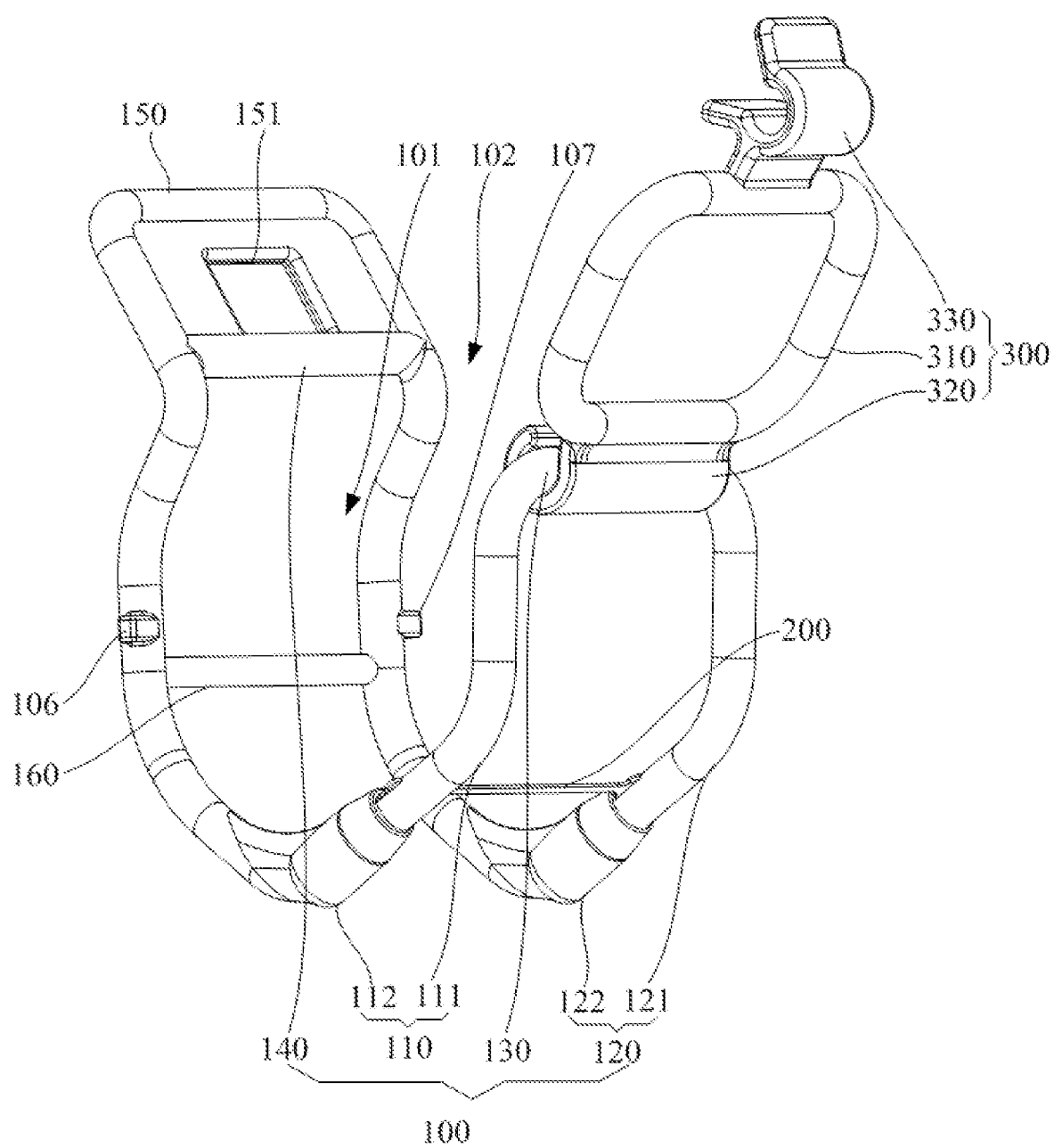
FIG. 4 is a schematic structural view of a rotary bracket, a noodle cutter and a fastening member in FIG. 1.

An existing dough extruder requires users to hold scissors and place the scissors outside the noodle out-coming hole to cut noodles according to any needed length. However, this operation often fails to smooth the breaks of noodles, and even leads to the problems of adhesion of noodles and inability to be completely separated, and results in poor user experience. Therefore, the present application provides a noodle cutter assembly. According to FIGS. 1 to 4, FIG. 1 is a schematic structural view of an embodiment of a noodle cutter assembly of the present application, where a rotary bracket is not assembled on a noodle out-coming die. FIG. 2 is another schematic structural view of the noodle cutter assembly in FIG. 1, where the rotary bracket has been assembled on the noodle out-coming die; FIG. 3 is still another schematic structural view of the noodle cutter assembly in FIG. 1, mainly showing a relationship between a noodle cutter and noodle out-coming holes; FIG. 4 is a schematic structural view of the rotary bracket, the noodle cutter and a fastening member in FIG. 1. Specifically, in the present embodiment, the noodle cutter assembly 10 includes:

a rotary bracket 100 including a first arm 110 and a second arm 120 opposite to each other, a bracket axis is arranged on the same side of the first arm 110 and the second arm 120, the first arm 110 and the second arm 120 are both arranged along a circumferential direction of the bracket axis, the rotary bracket 100 is sleeved on an outer side of a noodle out-coming die 400 and is configured to rotate relative to the noodle out-coming die 400; and, a noodle cutter 200 connected between the first arm 110 and the second arm 120, and configured for slidably abutting an outer edge of the noodle out-coming holes 401. In particular, the noodle cutter 200 functions like a string, and the first arm 110 and the second arm 120 function like a bow. The noodle cutter 200 is narrow, and the first arm 110 and the second arm 120 tighten the noodle cutter 200. Preferably, the first arm 110 and the second arm 120 are made of metal materials in order to strengthen a tightening force.

In the technical proposal of the present application, the rotary bracket 100 sleeved on the noodle out-coming die 400 is rotatable around the noodle out-coming die 400, therefore, the noodle cutter 200 connected between the first arm 110 and the second arm 120 is driven to slide reciprocally against the outer edge of the noodle out-coming hole 401, thereby forming a shearing force between the noodle cutter 200 and the outer edge of the noodle out-coming holes 401, and the noodles are evenly sheared off under an action of the shearing force, with flat breaks and no adhesion. Secondly, the user only needs to control the rotation of the rotary bracket 100 on the noodle out-coming die 400 to cut the noodles, so that a blind operation without paying attention to an operation of the noodle cutter 200 is to be realized. Compared with that the user needs to pay attention to scissors all the time when using the scissors, the technical proposal provided by the present application improves convenience of the noodle cutting operation of the dough extruder. Furthermore, the user may freely control a rotation of the rotary bracket 100 on the noodle out-coming die 400, that is to say, the reciprocating sliding of the noodle cutter 200 outside the noodle out-coming holes 401 is freely controlled, so that the user can cut the noodles at any needed length, for example, noodles with a longer length suitable for adults can be cut first, and noodles with a shorter length suitable for children can be cut secondly, therefore improving flexibility of cutting operations of the dough extruder. It should be noted that the axis of the bracket is arranged parallel or substantially parallel to the axis of the noodle out-coming die 400, when the segment cutter 200 is slidably abutted against an outer circumferential surface of the noodle out-coming die 400.

According to FIGS. 3 and 4, in order to improve rotation synchronization of the first arm 110 and the second arm 120, in this embodiment, the rotary bracket 100 further includes a first reinforcing arm 130 connecting the first arm 110 and the second arm 120. Understandably, as the first reinforcing arm 130 is connected between the first arm 110 and the second arm 120, even if the user only applies a driving force to the first arm 110, the driving force can further be applied to the second arm 120 under the force transmission of the first reinforcing arm 130, therefore, a rotation of the first arm 110 and the second arm 120 tends to be synchronized, and the noodle cutter 200 connected between the first arm 110 and the second arm 120 can be kept in a fitting relationship with the noodle out-coming die 400, thereby avoiding a problem of abnormal shearing of noodles, such as uneven breaks of noodles or adhesion of noodles caused by a failure of the noodle cutter 200 fully fitting with the noodle out-coming die 400.

According to FIGS. 3 and 4, in order to improve a structural strength of the rotary bracket 100, in this embodiment, the rotary bracket 100 further includes a second reinforcing arm 140 arranged opposite to the first reinforcing arm 130, the second reinforcing arm 140 connects the first arm 110 and the second arm 120, and the noodle cutter 200 is located between the first reinforcing arm 130 and the second reinforcing arm 140. The first reinforcing arm 130 and the second reinforcing arm 140 are arranged opposite to each other, so that the rotary bracket 100 forms a frame with a more stable structure, thereby improving the overall structural strength of the rotary bracket 100, enabling the noodle cutter 200 to maintain a more stable bonding relationship with the noodle out-coming die 400, and improving the stability and reliability of the cutting operation.

Figure 5:
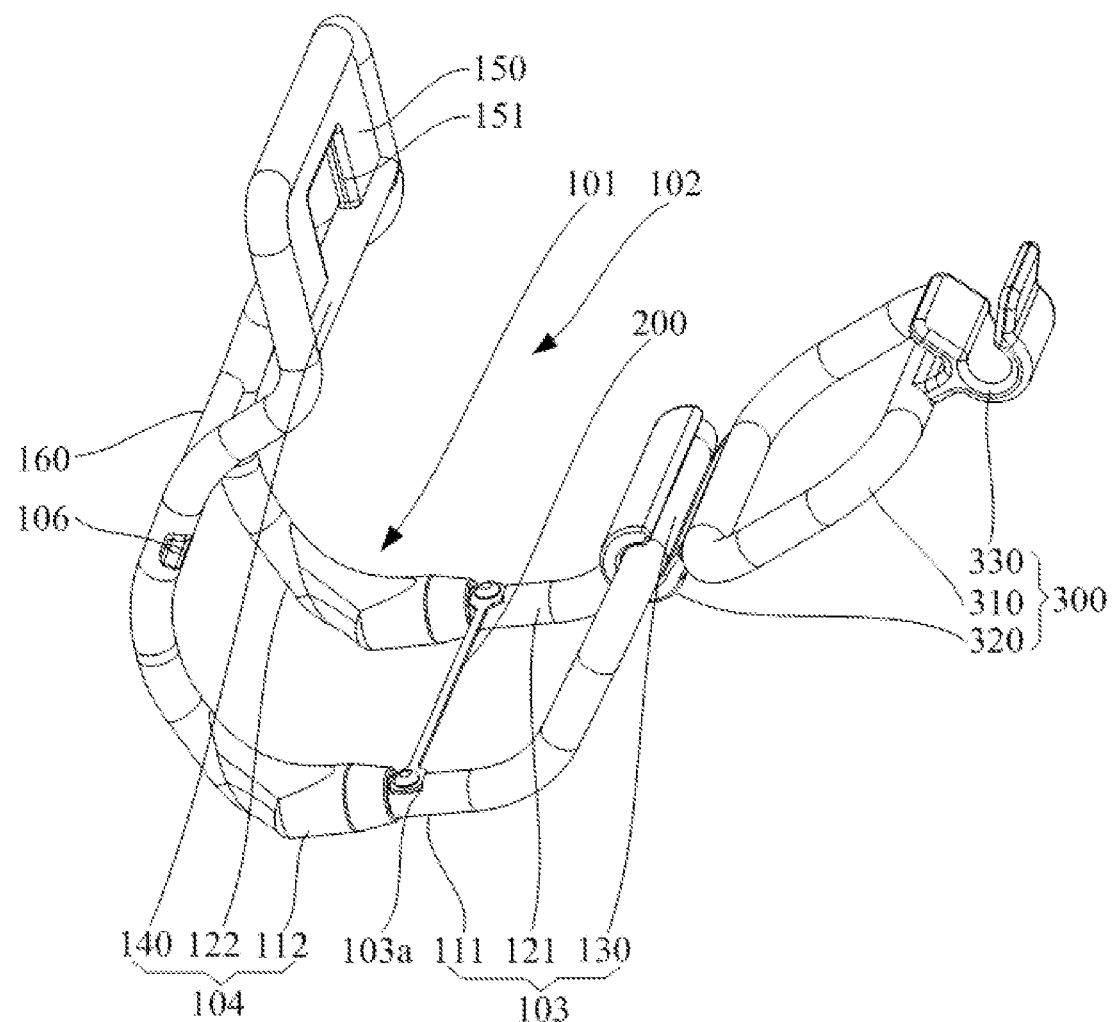
FIG. 5 is another schematic structural view of the rotary bracket, the noodle cutter and the fastening member in FIG. 1.

According to FIGS. 3 to 5, in the present embodiment, optionally, a central angle of the first arm 110 and/or the second arm 120 corresponding to the bracket axis is greater than 180 degrees, and the first arm 110, the second arm 120, the first reinforcing arm 130, and the second reinforcing arm 140 together define a mounting space 101 for receiving the noodle out-coming die 400. The center angles corresponding to the first arm 110 and the second arm 120 are set to be greater than 180 degree, so that when the noodle out-coming die 400 is placed in the mounting space 101, the first arm 110 and the second arm 120 encircle the noodle out-coming die 400, thereby a rotation of the first arm 110 and the second arm 120 on the noodle out-coming die 400 is more stable and reliable, the noodle cutter 200 maintains a more stable fit relationship with the noodle out-coming die 400, and stability and reliability of the cutting operation is improved. However, the present application is not limited to this. In other embodiments, arc lengths of the first arm and the second arm may correspond to a central angle corresponding to the bracket axis that is not greater than 180 degrees, and the noodle cutter assembly 10 further includes a buckling bracket connected to the first and second reinforcing arms, and extending along the circumferential direction of the bracket axis, and a central angle of the buckling bracket corresponding to the bracket axis is greater than 180 degrees.

According to FIGS. 3 to 5, in order to facilitate a disassembly and assembly of the rotary bracket 100 to the noodle out-coming die 400, in this embodiment, both the first arm 110 and the second arm 120 are elastically deformable, and a mounting opening 102 is provided between the first reinforcing arm 130 and the second reinforcing arm 140 and communicates with the mounting space 101. The mounting opening 102 is arranged opposite to the noodle cutter 200, and configured for enabling the noodle out-coming die 400 to move through and be clamped in the mounting space 101. The first arm 110 and the second arm 120 have the property of elastic deformation, so that a size of the mounting opening 102 is adjustable to be larger or smaller, thereby facilitating the user to sleeve the rotary bracket 100 on or detach the rotary bracket 100 from the noodle out-coming die 400 along a circumferential direction of the noodle out-coming die 400, namely, along the direction intersecting the bracket axis, so that the user can easily disassemble and clean the rotary bracket 100 and the noodle out-coming die 400. The user can completely clean the two parts, for example, to clean a sanitary dead corner formed at a joint between the two parts. In addition, when the user does not need to use the cutting function, for example, the noodle cutter 200 may not be used for making long noodles such as longevity noodles, the rotary bracket 100 and the noodle cutter 200 can be detached from the noodle out-coming die 400 together and stored separately. However, the present application is not limited to this. In other embodiments, the rotary bracket may be provided with the mounting opening communicated with the mounting space on a plane where the first arm or the second arm is located, and the noodle out-coming die is inserted into the mounting space from the mounting opening along the bracket axis.

According to FIGS. 3 and 5, in order to keep the noodle cutter 200 close to the noodle out-coming die 400 when cutting the noodles, in this embodiment, further, the first arm 110 includes a first arm segment 111 and a second arm segment 112 separately arranged, and the second arm 120 includes a third arm segment 121 and a fourth arm segment 122 separately arranged, with the first arm segment 111 and the third arm segment 121 being oppositely arranged, and the second arm segment 112 and the fourth arm segment 122 being oppositely arranged. The first arm segment 111, the first reinforcing arm 130, and the third arm segment 121 are integrally formed to form a first bracket 103, the noodle cutter 200 is connected between the first arm segment 111 and the third arm segment 121. The second arm segment 112, the second reinforcing arm 140, and the fourth arm segment 122 are integrally formed to form a second bracket 104, and the second bracket 104 is elastically deformable. By setting the first bracket 103 as a part which is not prone to elastic deformation, it facilitates to provide a stable pulling force to the noodle cutter 200 connected to the first bracket 103, so that the noodle cutter 200 is continuously attached to the outer edge of the noodle out-coming hole 401 when the noodle cutter 200 is rotated to cut the noodles, and a shearing effect achieved by both of them is kept in a good state, thereby smoothing the breaks of the noodles and avoiding noodle adhesion. Secondly, by setting the second bracket 104 as a part prone to elastic deformation, it facilitates the rotary bracket 100 to deform to change a size of the mounting opening 102, thereby improving the convenience of disassembly and assembly of the rotary bracket 100 and the noodle out-coming die 400.

In this embodiment the first bracket 103 is made of metal. Understandably, brackets made of metal materials usually have better strength and stiffness, and are less prone to elastic deformation. Among them, metal materials can be aluminum alloy, magnesium alloy or carbon steel with higher elastic modulus. Of course, a shape and a size of the first bracket 103 is also considered, for example, when the cross-sectional diameter of the first bracket 103 is set at 4 mm to 10 mm, the requirements of strength and rigidity is met without being cumbersome and affecting aesthetics, and the manufacturing cost of the first bracket 103 is controlled. However, the present application is not limited to this. In other embodiments, the first bracket may be of plastic material with higher hardness and rigidity, such as polyoxymethylene or polybutylene terephthalate, or a material incapable of elastic deformation, such as glass and ceramics.

In this embodiment, further, the second bracket 104 is made of plastic. Understandably, brackets made of plastic materials usually have better elastic deformation performance and are more prone to elastic deformation, the plastic materials can be materials with smaller elastic modulus such as polypropylene or polycarbonate. However the present application is not limited thereto and in other embodiments it may be a 65 # or 70 # or 65Mn carbon spring steel or an alloy spring steel.

In this embodiment, the two ends of the second bracket 104 are provided with two insertion holes corresponding to the first bracket 103, and the two ends of the first bracket 103 are respectively inserted in the two insertion holes. By adopting the scheme that the first bracket 103 is inserted on the second bracket 104 in an interference fit, the structure is simple and the assembly is convenient, and a manufacturing cost of the rotary bracket 100 is reduced. In addition, since the second bracket 104 is made of a plastic material, the insertion holes are provided on the second bracket 104, which facilitates a direct molding of the insertion holes during the manufacturing of the second bracket 104, therefore reducing a manufacturing cost of the second bracket 104. However, the present application is not limited to this. In other embodiments, the second bracket and the first bracket may be fixed by clamping, screwing, riveting or welding.

According to FIG. 5, in this embodiment, in order to ensure that the noodle cutter 200 is continuously in a stretched state when cutting noodles. The noodle cutter 200 is optionally fixed by riveting with the first bracket 103. Fixing the noodle cutter 200 to the first bracket 103 by a rivet ensures the connection strength and reliability, avoids looseness of the noodle cutter 200, and improves a neatness and aesthetics of a connection structure between the noodle cutter 200 and the first bracket 103. However, the present application is not limited to this. In other embodiments, the noodle cutter and the first bracket is fixed by clamping, screwing or welding.

According to FIG. 5, in order to improve the mounting stability of the noodle cutter 200 and the first bracket 103, in this embodiment, the first bracket 103 is optionally provided with a sinking groove 103*a* corresponding to the noodle cutter 200, the sinking groove 103*a* extends along a length direction of the noodle cutter 200, the noodle cutter 200 has a wide side surface and a narrow side surface, and the wide side surface of the noodle cutter 200 abuts against a groove bottom surface of the sinking groove 103*a*.

According to FIG. 5, in this embodiment, optionally, the central angle of the first bracket 103 corresponding to the bracket axis is smaller than the central angle of the second bracket 104 corresponding to the bracket axis, and the noodle cutter 200 is provided at an end of the first bracket 103 adjacent to the second bracket 104. By making the second bracket 104, which is prone to elastic deformation, larger, a size of the mounting opening 102 can be sufficiently expanded when the rotary bracket 100 deforms, so that the noodle out-coming die 400 is easily pass through the mounting opening 102, thereby improving a convenience of disassembly and assembly the rotary bracket 100 and the noodle out-coming die 400. In addition, it can be understood that a manufacturing cost of a plastic bracket is usually higher than that of a metal bracket of same shape and same size. The main function of the first bracket 103 is to provide a relatively stable pulling force for the noodle cutter 200, so it is not necessary to make the first bracket 103 too long, therefore reducing the overall manufacturing cost of the rotary bracket 100. The noodle cutter 200 is provided at one end of the first holder 103 close to the second holder 104 to avoid that the noodle cutter 200 is too close to the first reinforcing arm 130 and the first reinforcing arm 130 easily contacts noodles extruded from the noodle out-coming holes 401 and hinders the noodle extrusion when the noodle cutter 200 shears the noodles.

In this embodiment, optionally, the cutter 200 is a metal line cutter. The metal line cutter can be made thin and flexible enough to better meet the requirement of continuously and tightly fitting the noodle out-coming die 400 when shearing the noodles. In addition, it can be understood that the noodles are easy to be cut off because they are soft, so the metal line cutter meets functional requirements of cutting noodles without sharpening. However, the present application is not limited thereto, and in other embodiments, a metal blade or a ceramic blade can be used.

According to FIGS. 4 and 5, in order to facilitate a user to apply a driving force on the rotary bracket 100, in this embodiment, the rotary bracket 100 further includes a hand-driving member 150 connected to the second reinforcing arm 140, and the hand-driving member 150 is arranged obliquely extending in a direction away from the mounting opening 102 in a direction away from the noodle cutter 200. When the rotary bracket 100 is fitted to the noodle out-coming die 400, the user drives the rotary bracket 100 to rotate around the noodle out-coming die 400 by applying a driving force to the hand-driving member 150, that is, by moving the hand-driving member 150 by hand, the noodle cutter 200 is caused to reciprocate and cut the extruded noodles. Secondly, since the hand-driving member 150 is arranged obliquely in a direction away from the mounting opening 102, the situation that the hand-driving member 150 obstructs the noodle out-coming die 400 from passing through the mounting opening 102 is avoided, thereby improving a mounting convenience of the rotary bracket 100. Furthermore, it will be understood that when the noodle out-coming die 400 is fitted to the dough extruder body for use, the noodle out-coming holes 401 are generally disposed directly below the noodle out-coming die 400 so that extruded noodles can be naturally suspended under an action of gravity without interfering with each other or sticking together. When the noodle cutter 200 is positioned directly below the noodle out-coming die 400 when cutting the noodles, the hand-driving member is relatively positioned above the noodle out-coming die 400 because the second arm reinforcement is arranged opposite to the noodle cutter 200, so that the hand-driving member is to be conveniently operated by a user without sight obstruction. However, the present application is not limited thereto. In other embodiments, the hand-driving member may be disposed on the first reinforcement arm, and in a direction away from the first arm, the hand-driving member may be disposed obliquely extending in a direction away from the mounting opening.

In order to reduce the manufacturing cost of the hand-driving member, the hand-driving member is optionally integrally formed with the second bracket 104 in the present embodiment.

Figure 1:
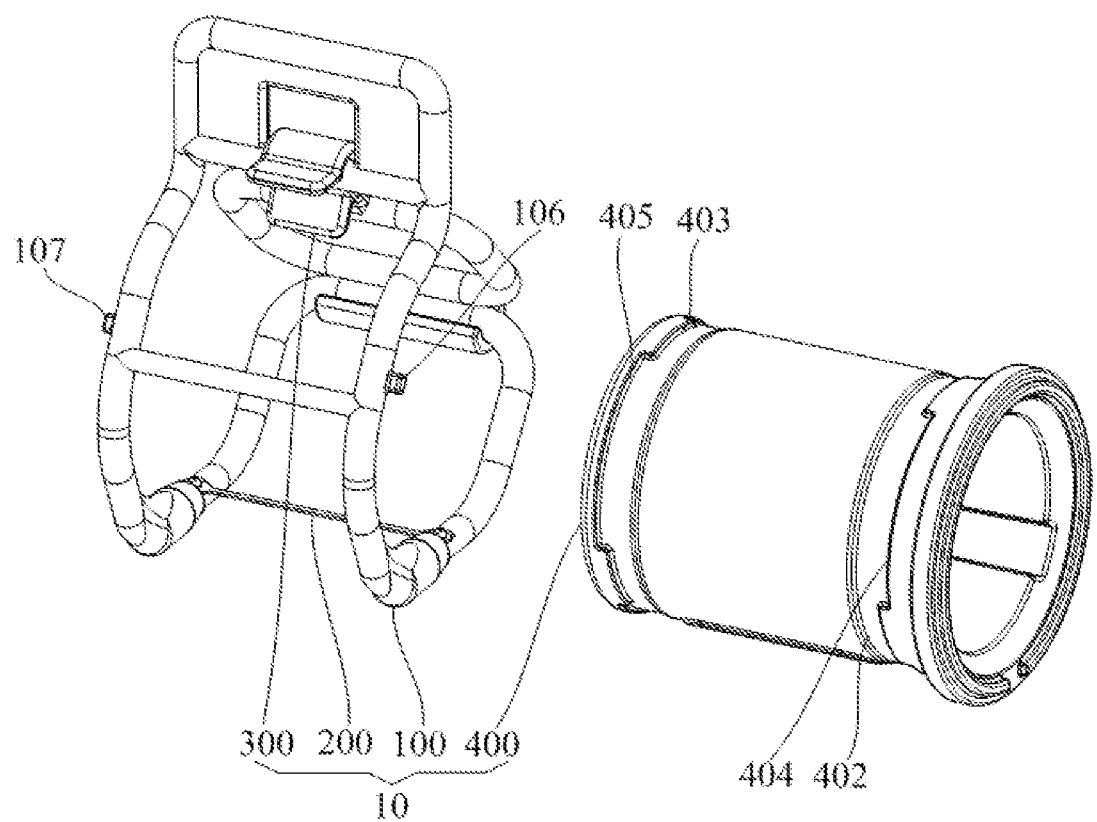
FIG. 1 is a schematic structural view of an embodiment of a noodle cutter assembly of the present application.
Figure 6:
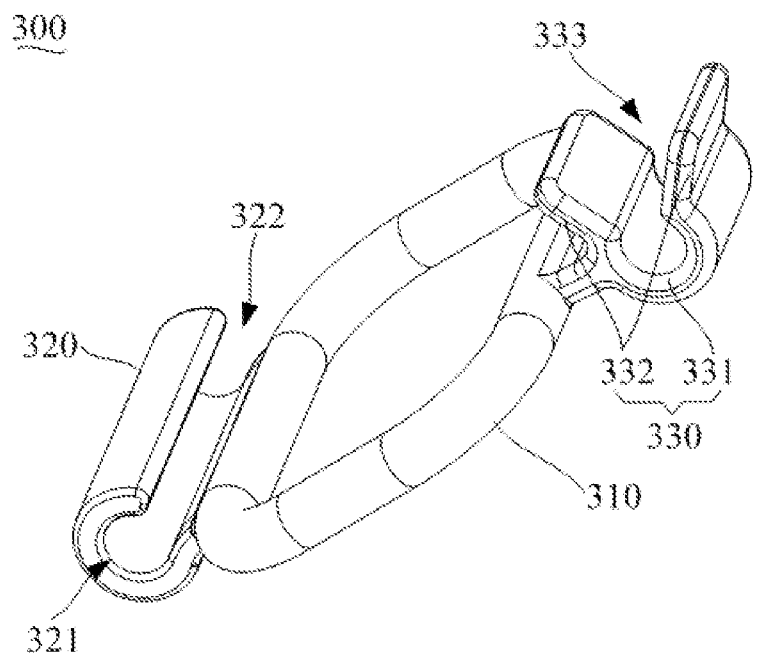
FIG. 6 is a schematic structural view of the fastening member in FIG. 5.
Figure 7:
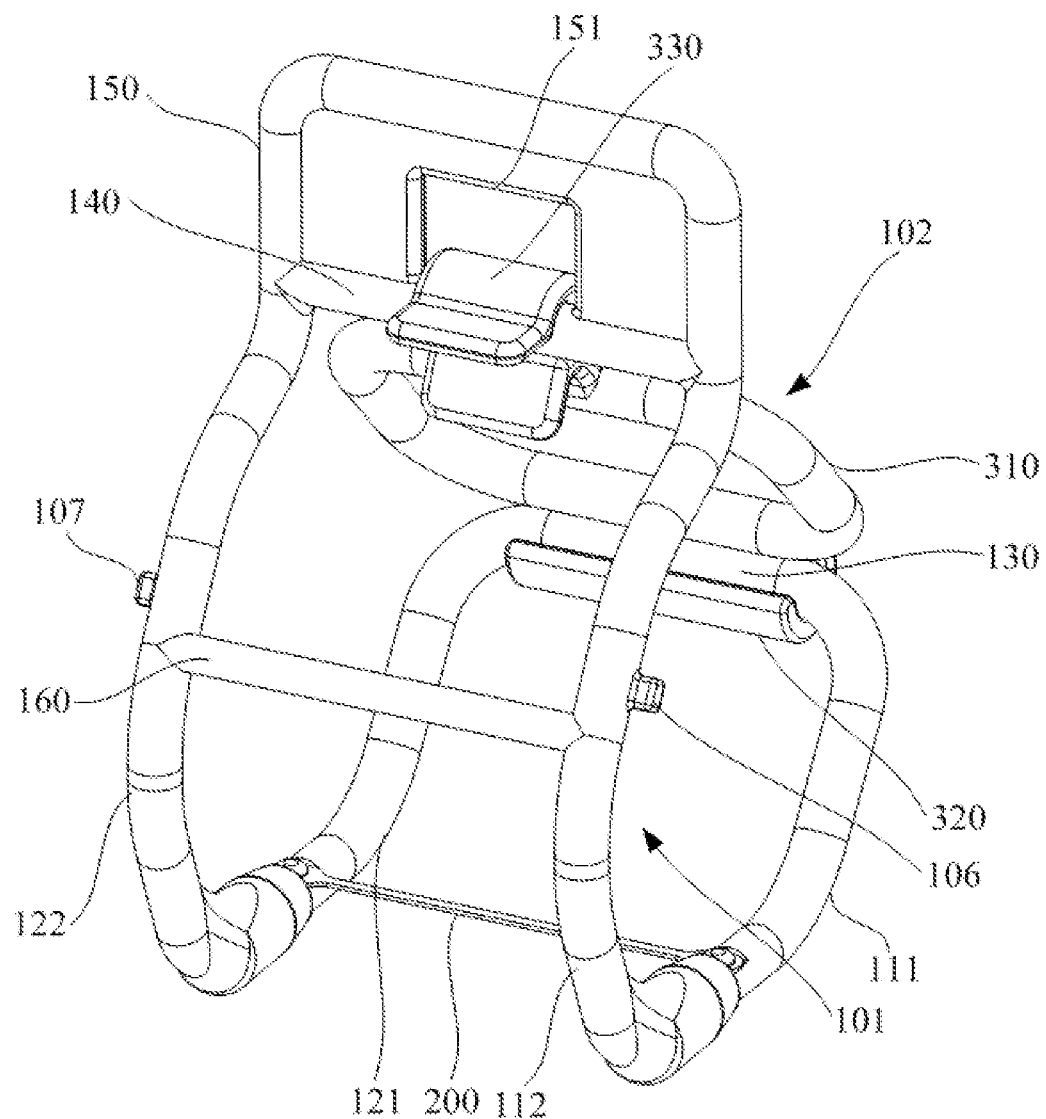
FIG. 7 is still another schematic structural view of the rotary bracket, the noodle cutter and the fastening member in FIG. 1.

Referring to FIGS. 5 to 7, FIGS. 5 and 7 are other structural views of the rotary bracket, the noodle cutter and the fastening member in FIG. 1, and FIG. 6 is a structural view of the fastening member in FIG. 5. In FIG. 5, the fastening member is in an open position, and in FIG. 7, the fastening member is in a fastened position. In order to reduce a negative influence of a user's hand driving force on a form of the rotary bracket 100, in this embodiment, the noodle cutter assembly 10 further includes a fastening member 300 provided at the mounting opening 102, one end of the fastening member 300 is rotatably connected to the first reinforcing arm 130, and the other end is detachably connected to the second reinforcing arm 140. One end of the fastening member 300 is rotatably connected to the first reinforcing arm 130 and has an open position and a fastened position. In the fastened position, the other end of the fastening member 300 is connected to the second reinforcing arm 140 to close the mounting opening 102, so that the noodle out-coming die 400 cannot enter or leave the mounting space 101 through the mounting opening 102. In the open position, the other end of the fastening member 300 is disengaged from the second reinforcing arm 140 to open the mounting opening 102, the noodle out-coming die 400 is able to enter or leave the mounting space 101 through the mounting opening 102. The fastening member 300 tightens the first reinforcing arm 130 and the second reinforcing arm 140, thereby avoiding affecting the contact of the rotary bracket 100 and the noodle out-coming die 400 by a driving force from the user when pulling the hand-driving member, enabling the noodle cutter 200 to better adhere to the noodle out-coming die 400 when cutting noodles, and ensuring a flatness of the breaks. However, the present application is not limited to this. In other embodiments, the noodle cutter assembly may also include a fastening member arranged at the mounting opening, and both ends of the fastening member are respectively clamped with the first reinforcing arm and the second reinforcing arm.

According to FIGS. 5 and 6, in the present embodiment, optionally, the fastening member 300 includes a base portion 310, a rotating portion 320 and an engaging portion 330 connected to opposite sides of the base portion 310. The rotating portion 320 is rotatably connected to the first reinforcing arm 130, and the engaging portion 330 is engaged with the second reinforcing arm 140 when the fastening member 300 is in the fastened position, and disengaged from the second reinforcing arm 140 when the fastening member 300 is in the open position. The snap connection mode facilitates the disassembly and assembly of the fastening member 300 and the rotary bracket 100, therefore improving the convenience of using the noodle cutter assembly 10. However, the present application is not limited to this, in other embodiments, the fastening member may further include a base portion, a rotating portion and screw-connecting post respectively arranged at opposite ends of the base portion, the screw-connecting post is rotatably connected to the base portion, a cylindrical surface of the screw-connecting post is provided with external threads, the second reinforcing arm is provided with screw-connecting holes corresponding to the screw-connecting post, and the screw-connecting holes are provided with internal threads matched with the external threads of the screw-connecting post. The rotating portion is rotatably connected with the first reinforcing arm, when the fastening member is in the fastened position, the screw-connecting post is connected with the screw-connecting holes, and when the fastening member is in the open position, the screw-connecting post is separated from the screw-connecting holes.

Referring to FIG. 5 and FIG. 6, in the present embodiment, optionally, the engaging portion 330 includes a clamping segment 331 and two guide segments 332 respectively connected to both ends of the clamping segment 331, the two guide segments 332 are arranged opposite to each other and extended obliquely away from each other in a direction away from the clamping segment 331, and the clamping segment 331 and the two guide segments 332 jointly define a first clamping interface 333. By providing the two guide segments 332, it is advantageous to improve a convenience of disassembly and assembly of the engaging portion 330 and the second reinforcing arm 140. However, the present application is not limited to this. In other embodiments, the fastening member is a spherical body provided with communicated clamping interfaces and a spherical inner cavity, and the central angle corresponding to the clamping interfaces is less than 180 degrees. The second reinforcing arm is provided with a spherical clamping convex matched with the spherical inner cavity.

Referring to FIGS. 5 and 6, in the present embodiment, optionally, an inner wall surface of the clamping segment 331 is a cylindrical surface and the corresponding central angle is greater than 180 degrees, and a part of the second reinforcing arm 140 corresponding to the clamping segment 331 is a cylindrical body. By setting the engagement structure of the engagement segment 331 and the second reinforcing arm 140 in a cylindrical surface shape, a contact area of the engagement can be increased, therefore improving stability and reliability of the engagement, and smoothness of the installation or disassembly process can be improved following the guiding of the cylindrical surface.

Referring to FIG. 6, the base portion 310 is optionally provided as an annular frame in the present embodiment in order to save materials for manufacturing the fastening member 300 and reduce a manufacturing cost of the fastening member 300. However, the present application is not limited to this, and in other embodiments, the base portion may be a grid plate.

Referring to FIGS. 4 to 6 in the present embodiment the rotating portion 320 is optionally detachably connected to the first reinforcing arm 130. Because the rotating portion 320 is also detachable, the fastening member 300 as a whole can be detached from the rotary bracket 100 to facilitate separate cleaning of the two parts, therefore achieving a better cleaning effect. However, the present application is not limited thereto. In other embodiments, the rotating part may be rotatably connected to the first reinforcing arm through a hinge.

Referring to FIGS. 4 to 6, in the present embodiment, the rotating portion 320 is optionally provided as a rotating tube, the rotating tube is provided with an inner cavity 321, and a second clamping interface 322 communicated with the inner cavity 321, the second clamping interface 322 is provided on a side wall of the rotating tube, and the first reinforcing arm 130 is clamped in the inner cavity 321 through the second clamping interface 322. The rotating tube is elastically deformable, so that the wall of the rotating tube is elastically deformed when the first reinforcing arm 130 passes through the second clamping interface 322, and the first reinforcing arm 130 is easily clamped in the inner cavity 321 of the rotating tube, thereby improving a installation convenience of the fastening member 300 and the rotary bracket 100. However, the present application is not limited to this. In other embodiments, the rotating portion may be two rotating bolts separately arranged on opposite sides of the base portion, and the first reinforcing arm is provided with rotating convexs corresponding to the rotating bolts, and the rotating convexs are provided with rotating holes for receiving the rotating bolts.

Referring to FIGS. 6 and 7, in this embodiment the second clamping interface 322 is optionally disposed toward the second reinforcing arm 140 when the fastening member 300 is in the fastened position. The fastening member 300 is configured to tighten the first reinforcing arm 130 and the second reinforcing arm 140 to make the noodle cutter 200 be better attached to the noodle out-coming die 400 when cutting the noodles, the second clamping interface 322 is arranged towards the second reinforcing arm 140, so that the first reinforcing arm 130 is not easily slipped out of the second clamping interface 322 when the fastening member 300 is in operation, thereby ensuring that the fastening member 300 tightens the first reinforcing arm 130 and the second reinforcing arm 140 continuously and stably.

Referring to FIG. 7 in the present embodiment the hand-driving member 150 is optionally a hand-driving plate provided with a snap through hole 151 corresponding to the engaging portion 330. The hand-driving plate has a simple structure and can provide a larger contact area for the user, therefore enabling the user to operate the hand-driving plate more comfortably and labor-saving. However, the present application is not limited thereto, and in other embodiments, the hand-driving member may also be a hand screw threaded to the first bracket.

Referring to FIGS. 1 to 3 and FIG. 8, in order to make a rotation of the rotary bracket 100 on the noodle out-coming die 400 more smooth and stable, in the present embodiment, the noodle cutter assembly 10 further includes the noodle out-coming die 400 for connecting with the dough extruder body, a plurality of noodle out-coming holes 401 are arranged on an outer circumferential surface of the noodle out-coming die 400, and the noodle cutter 200 is slidably abutted on outer edges of the noodle out-coming holes 401. The outer circumferential surface of the noodle out-coming die 400 is also provided with a first sliding groove 402 and a second sliding groove 403 for sliding contact the first arm 110 and the second arm 120, respectively. The first sliding groove 402 and the second sliding groove 403 are both extending along a circumferential direction of the noodle out-coming die 400.

Referring to FIGS. 1 to 3 and 8, in the present embodiment, the first sliding groove 402 and the second sliding groove 403 are optionally annularly arranged on the outer circumferential surface of the noodle out-coming die 400, so that the first arm 110 and the second arm 120 can be quickly mounted in place regardless of an angle from which the rotary bracket 100 is sleeved on the noodle out-coming die 400.

Referring to FIGS. 1 to 4, and 8, according to FIG. 1, in this embodiment, the noodle out-coming die 400 is further provided with a first limiting groove 404 and a second limiting groove 405 corresponding to the first arm 110 and the second arm 120, respectively. The first limiting groove 404 and the second limiting groove 405 are both provided along the circumferential direction of the noodle out-coming die 400. The first arm 110 is provided with a first limiting protrusion 106 for slidably abutting the first limiting groove 404, and the second arm 120 is provided with a second limiting protrusion 107 for sliding abutting the second limiting groove 405. The first limiting protrusion 106 and the second limiting protrusion 107 can slide only in the first limiting groove 404 and the second limiting groove 405 correspondingly, therefore defining the angle range of reciprocating rotation of the noodle cutter 200. That is, the reciprocating rotation of the noodle cutter 200 is limited in a vicinity of the noodle out-coming holes 401, so that the user can more easily know the rotation angle range required by the noodle cutter 200 to complete the cutting of noodles, thereby avoiding unnecessary rotation operation and energy and physical strength wasting, and improving convenience of cutting operation.

Figure 8:
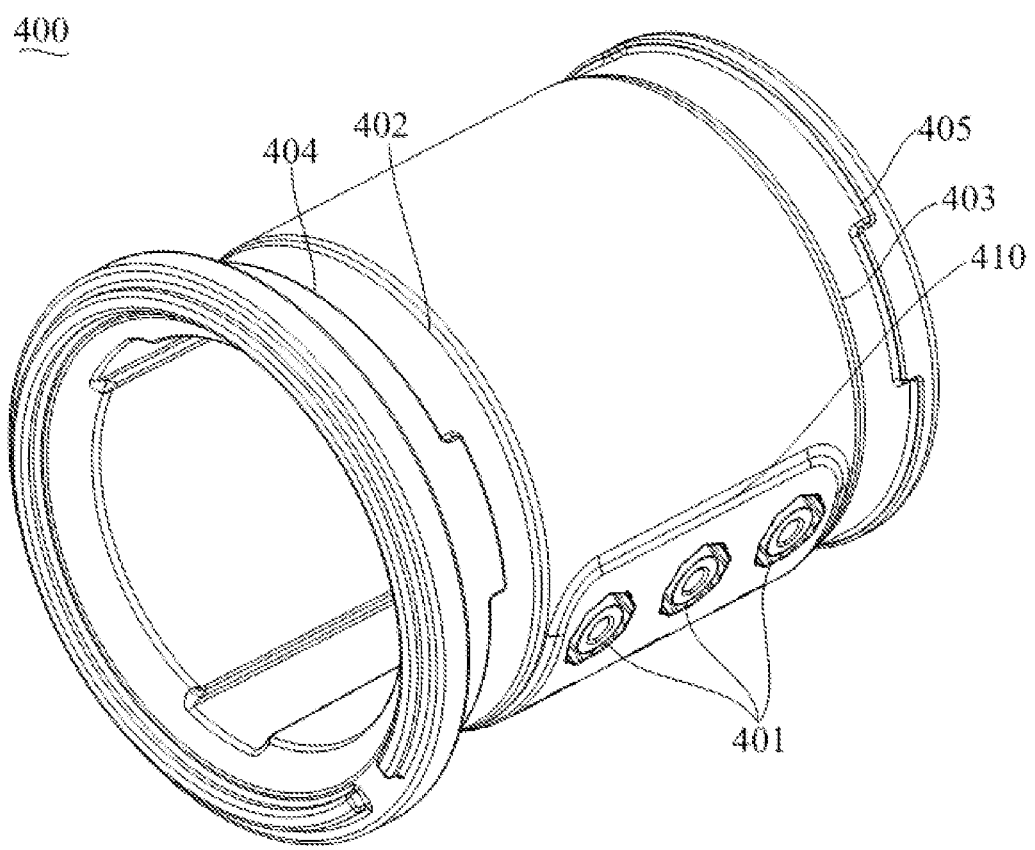
FIG. 8 is a schematic structural view of a noodle out-coming die in FIG. 1.

Referring to FIGS. 1, 2, and 8, in order to simplify a configuration of the noodle out-coming die 400 to reduce its manufacturing cost, optionally in this embodiment, the first limiting groove 404 is communicated with the first sliding groove 402, and the second limiting groove 405 is communicated with the second sliding groove 403.

Referring to FIG. 5, optionally in this embodiment, the first limiting protrusion 106 and the second limiting protrusion 107 are both provided on the second bracket 104, and the first limiting protrusion 106, the second limiting protrusion 107 and the second bracket 104 are integrally formed. Since the second bracket 104 is made of a plastic material, the first limiting protrusion 106 and the second limiting protrusion 107 can be formed in the injection molding process of the second bracket 104, a structure of the rotary bracket 100 is simplified and the manufacturing cost of the rotary bracket 100 is reduced. However, the present application is not limited thereto, and in other embodiments, the first limiting protrusion and/or the second limiting protrusion may be provided as welding bumps welded to the first bracket.

Referring to FIGS. 4 and 5, in the present embodiment, further, the second bracket 104 is provided with a third reinforcing arm 160 corresponding to the first limiting protrusion 106 and the second limiting protrusion 107, and the third reinforcing arm 160 is connected between the second arm segment 112 and the fourth arm segment 122. The second bracket 104 is partially reinforced by the third reinforcing arm 160, so that the first limiting protrusion 106 can be slidably abutted against the first limiting groove 404 stably, and the first limiting protrusion 106 can be slidably abutted against the first limiting groove 404 stably.

Referring to FIG. 3 and FIG. 8, in order to reduce unnecessary wear during rotation of the noodle cutter 200, in this embodiment, a plurality of noodle out-coming bosses 410 are further provided on the outer circumferential surface of the noodle out-coming die 400, and the plurality of noodle out-coming holes 401 are distributed at intervals along a surface of the noodle out-coming bosses 410, and the noodle cutter 200 is slidably abutting against the surface. When the noodle cutter 200 is rotated, the noodle cutter 200 only slidably contacts the noodle out-coming bosses 410 and does not contact other portions of the outer circumferential surface of the noodle out-coming die 400, thereby reducing unnecessary wear of the noodle cutter 200 and prolonging a service life of the noodle cutter 200.

In order to improve flexibility of using the noodle out-coming die 400, in the present embodiment, the plurality of noodle out-coming bosses 410 are optionally, the plurality of noodle out-coming bosses 410 are distributed at intervals along the circumferential direction of the noodle out-coming die 400, and shapes and/or sizes of the noodle out-coming holes 401 on at least two noodle out-coming bosses 410 are different. The user can select one of the noodle out-coming bosses 410 according to different requirements to produce noodles with different shapes or sizes, therefore improving the flexibility of using the noodle out-coming die 400 to meet diverse requirements of the user, and improving a user experience.

Referring to FIGS. 3 and 8, optionally, edges of the noodle out-coming protrusions 410 are rounded. The noodle cutter 200 can be smoothly slid into and out of the noodle out-coming bosses 410, therefore reducing a risk of damage of the noodle cutter 200.

Figure 9:
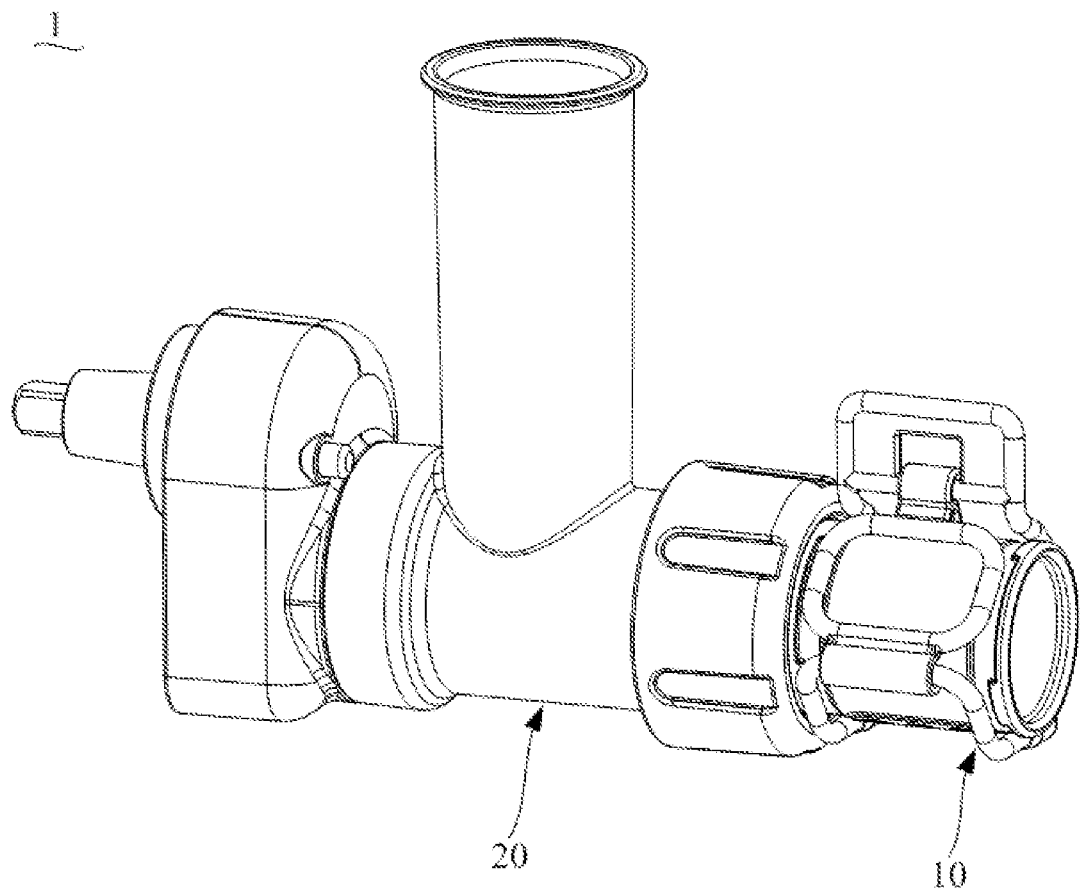
FIG. 9 is a schematic structural view of an embodiment of a dough extruder of the present application.

Referring to FIG. 9, the present application also provides a dough extruder 1, which includes a dough extruder body 20 and the aforementioned cutter assembly 10. A specific structure of the noodle cutter assembly refers to the above-mentioned embodiments. Since the dough extruder 1 adopts all of the technical schemes of the above-mentioned embodiments, it has at least all the beneficial effects brought by the technical schemes of the above-mentioned embodiments, which will not be repeated here. The noodle cutter assembly 10 is connected to the dough extruder body 20.

The above are only optional embodiments of the present application, and are not therefore limiting the patent scope of the present application. Any equivalent structural transformation made by using the contents of the present specification and drawings, or direct/indirect application in other related technical fields, under the inventive concept of the present application, is included in the patent scope of the present application.

What is claimed is:

1. A noodle assembly, configured to be connected to a noodle out-coming die of a dough extruder, an outer peripheral surface of the noodle out-coming die being provided with a plurality of noodle out-coming holes, wherein the noodle cutter assembly comprises:
    a rotary bracket comprising a first arm and a second arm opposite to each other, wherein the rotary bracket comprises a bracket axis arranged on a same side of the first arm and the second arm, the first arm and the second arm are all extended along a circumferential direction of the bracket axis, the rotary bracket is configured for sleeving an outer side of the noodle out-coming die and rotating relative to the noodle out-coming die; and,
    a noodle cutter connected between the first arm and the second arm, and configured for slidably abutting outer edges of the noodle out-coming holes, wherein the rotary bracket further comprises a first reinforcing arm connecting the first arm and the second arm, and wherein the rotary bracket further comprises a second reinforcing arm opposite to the first reinforcing arm, the second reinforcing arm is connected with the first arm and the second arm, and the noodle cutter is positioned between the first reinforcing arm and the second reinforcing arm.

2. The noodle a cutter assembly of claim 1, wherein a central angle of the first arm and/or the second arm corresponding to the bracket axis is greater than 180 degrees, and the first arm, the second arm, the first reinforcing arm and the second reinforcing arm together define a mounting space for receiving the noodle out-coming die.

3. The noodle cutter assembly of claim 2, wherein both the first arm and the second arm are elastically deformable, and a mounting opening communicated with the mounting space is arranged between the first reinforcing arm and the second reinforcing arm and opposite to the noodle cutter, and the mounting opening is configured for the noodle out-coming die to move through and be clamped in the mounting space.

4. The noodle cutter assembly of claim 3, wherein the first arm comprises a first arm segment and a second arm segment, the second arm comprises a third arm segment and a fourth arm segment, the first arm segment and the third arm segment are disposed oppositely, and the second arm segment and the fourth arm segment are disposed oppositely;
    the first arm segment, the first reinforcing arm and the third arm segment are integrally formed to form a first bracket, the noodle cutter assembly is connected between the first arm segment and the third arm segment, the second arm segment, the second reinforcing arm and the fourth arm segment are integrally formed to form a second bracket, and the second bracket is elastically deformable.

5. The noodle cutter assembly of claim 4, wherein the first bracket is made of metal; and/or,
    the second bracket is made of plastic material; and/or,
    two inserting holes are arranged at two ends of the second bracket corresponding to the first bracket, and two ends of the first bracket are respectively inserted in the two inserting holes; and/or
    the rotary bracket further comprises a hand-driving member connected to the second reinforcing arm, and obliquely extended in a direction away from the mounting opening in a direction away from the noodle cutter; and/or, the noodle cutter assembly further comprises a fastening member arranged at the mounting opening, one end of the fastening member is rotatably connected with the first reinforcing arm, and the other end is detachably connected with the second reinforcing arm.

6. The noodle cutter assembly of claim 1, wherein the first arm and the second arm are in slidably contact with a first sliding groove and a second sliding groove defined and extended along the outer circumferential surface of the noodle out-coming die correspondingly.

7. The noodle cutter assembly of claim 6, wherein, the first arm is provided with a first limiting protrusion and the second arm is provided with a second limiting protrusion, the first limiting protrusion is configured for slidably abutting a first limiting groove defined and extended along the noodle out-coming die, and the second limiting protrusion is configured for slidably abutting a second limiting groove defined and extended along the noodle out-coming die; and/or, the outer circumferential surface of the noodle out-coming die is further provided with a plurality of noodle out-coming bosses, and a plurality of noodle out-coming holes are distributed at intervals on the noodle out-coming bosses, and the noodle cutter is slidably abutting surfaces of the noodle out-coming bosses.

8. A dough extruder comprising the noodle cutter assembly of claim 1.

9. The dough extruder of claim 8, wherein a central angle of the first arm and/or the second arm corresponding to the bracket axis is greater than 180 degrees, and the first arm, the second arm, the first reinforcing arm and the second reinforcing arm together define a mounting space for receiving the noodle out-coming die.

10. The dough extruder of claim 9, wherein both the first arm and the second arm are elastically deformable, and a mounting opening communicated with the mounting space is arranged between the first reinforcing arm and the second reinforcing arm and opposite to the noodle cutter, and the mounting opening is configured for the noodle out-coming die to move through and be clamped in the mounting space.

11. The dough extruder of claim 10, wherein the first arm comprises a first arm segment and a second arm segment, the second arm includes a third arm segment and a fourth arm segment, the first arm segment and the third arm segment are disposed oppositely, and the second arm segment and the fourth arm segment are disposed oppositely; the first arm segment, the first reinforcing arm and the third arm segment are integrally formed to form a first bracket, the noodle cutter assembly is connected between the first arm segment and the third arm segment, the second arm segment, the second reinforcing arm and the fourth arm segment are integrally formed to form a second bracket, and the second bracket is elastically deformable.

12. The dough extruder of claim 11, wherein the first bracket is made of metal; and/or, the second bracket is made of plastic material; and/or, two inserting holes are arranged at two ends of the second bracket corresponding to the first bracket, and two ends of the first bracket are respectively inserted in the two inserting holes; and/or the rotary bracket further comprises a hand-driving member connected to the second reinforcing arm, and obliquely extended in a direction away from the mounting opening in a direction away from the noodle cutter; and/or, the noodle cutter assembly further comprises a fastening member arranged at the mounting opening, one end of the fastening member is rotatably connected with the first reinforcing arm, and the other end is detachably connected with the second reinforcing arm.

13. The dough extruder of claim 8, wherein the first arm and the second arm are in slidably contact with a first sliding groove and a second sliding groove defined and extended along the outer circumferential surface of the noodle out-coming die correspondingly.

14. The dough extruder according to claim 13, wherein the first arm is provided with a first limiting protrusion and the second arm is provided with a second limiting protrusion, the first limiting protrusion is configured for slidably abutting a first limiting groove defined and extended along the noodle out-coming die, and the second limiting protrusion is configured for slidably abutting a second limiting groove defined and extended along the noodle out-coming die; and/or, the outer circumferential surface of the noodle out-coming die is further provided with a plurality of noodle out-coming bosses, and a plurality of noodle out-coming holes are distributed at intervals on the noodle out-coming bosses, and the noodle cutter is slidably abutting surfaces of the noodle out-coming bosses.

* * * * *